United States Patent [19]

Fukui et al.

[11] Patent Number: 5,420,614
[45] Date of Patent: May 30, 1995

[54] DIGITAL IMAGE FORMING APPARATUS

[75] Inventors: Kazuyuki Fukui, Toyohashi; Yoshinobu Hada; Takanobu Yamada, both of Toyokawa, all of Japan

[73] Assignee: Minolta Camera Kabushiki Kaisha, Osaka, Japan

[21] Appl. No.: 971,055

[22] Filed: Nov. 3, 1992

[30] Foreign Application Priority Data

Nov. 6, 1991 [JP] Japan ................................. 3-289835

[51] Int. Cl.⁶ ........................................... G01D 9/42
[52] U.S. Cl. ........................... 346/130; 358/298; 347/131; 347/240
[58] Field of Search ................ 346/108, 160, 1.1; 358/298

[56] References Cited

U.S. PATENT DOCUMENTS

| | | | |
|---|---|---|---|
| 4,390,882 | 6/1983 | Ohara et al. | 346/1.1 |
| 4,862,289 | 8/1989 | Shimada | 358/298 |
| 4,912,568 | 3/1990 | Shimano et al. | 358/457 |
| 4,969,047 | 11/1990 | Sasaki et al. | 358/296 |
| 4,987,484 | 1/1991 | Ikeda et al. | 358/75 |
| 5,017,944 | 5/1991 | Kitamura et al. | 346/108 |
| 5,041,848 | 8/1991 | Gilbert et al. | 346/108 |
| 5,062,002 | 10/1991 | Dahlquist et al. | 358/298 |
| 5,128,699 | 7/1992 | Nakajima et al. | 346/160 |
| 5,189,441 | 2/1993 | Fukui et al. | 346/160 |
| 5,241,324 | 8/1993 | Tamura et al. | 346/1.1 |

*Primary Examiner*—Benjamin R. Fuller
*Assistant Examiner*—Randy W. Gibson
*Attorney, Agent, or Firm*—Willian Brinks Hofer Gilson & Lione

[57] ABSTRACT

In a digital image forming apparatus with use of electrophotographic process, an electrostatic latent image is formed by modulating the intensity of laser beam according to image data to expose a photoconductor in the raster scan to form an electrostatic latent image. A scan line is divided into groups of consecutive dots, and the exposure of the photoconductor with the beam is allowed only for a predetermined light-emitting time within the time needed to scan a predetermined period of consecutive dots in the scan line direction. Thus, the exposure is stopped periodically and the smoothness of a reproduced image is improved.

18 Claims, 13 Drawing Sheets

1 dot 80%

2 dots 80%

3 dots 80%

4 dots 80%

Fig.3(a) (N=1, X=80%)
Fig.3(b)
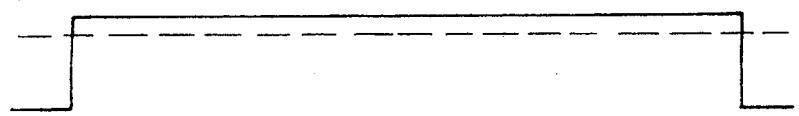
Fig.3(c) (N=2, X=80%)
Fig.3(d) (N=3, X=80%)
Fig.3(e) (N=4, X=80%)

1 dot 80%

2 dots 80%

3 dots 80%

4 dots 80%

Fig.5(a)    (N=1, X=60%)
Fig.5(b)
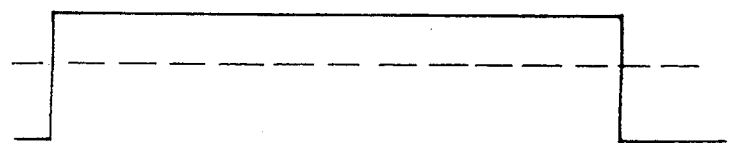
Fig.5(c)    (N=2, X=60%)
Fig.5(d)    (N=3, X=60%)
Fig.5(e)    (N=4, X=60%)

Fig.7(a)    (N=1, X=50%)
Fig.7(b)
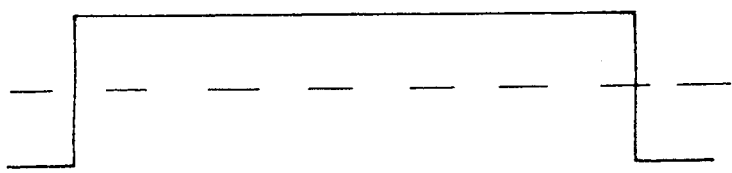
Fig.7(c)    (N=2, X=50%)
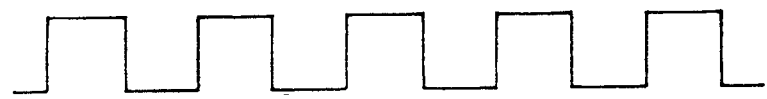
Fig.7(d)    (N=4, X=50%)
Fig.7(e)
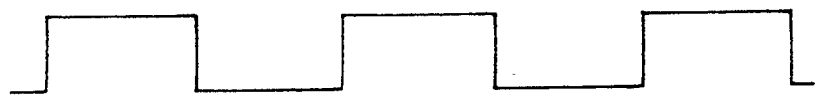

1 dot 50%

2 dots 50%

3 dots 50%

4 dots 50%

DIGITAL IMAGE FORMING APPARATUS

BACKGROUND OF THE INVENTION

1. Field of the Invention

The present invention relates to a digital image forming apparatus such as a digital printer or a digital copying machine wherein the light intensity for exposing the photoconductor is modulated according to image data to express gradation.

2. Description of the Prior Art

In a digital image forming apparatus wherein an image is formed by changing the light intensity of laser beam in the electrophotographic process, the photoconductor is exposed at a light intensity modulated in correspondence to a multi-level read density data of a document image. In general, the read image density of a document read by a sensor is not proportional to the reproduced image density due to the photosensitive characteristics of the photoconductor or the characteristics of toners. In other words, the gradation characteristic of the reproduced image density level shows a nonlinear characteristic in contrast to the linear characteristic to be realized. Especially, this is a large factor to deteriorate the fidelity of the reproduced image for a half-tone image included in a document.

The gradation characteristic is also affected largely by a technique to convert the read image density level to the light emitting level for exposure. The digital gradation expression techniques with use of the laser intensity modulation includes techniques such as laser intensity modulation, pulse width modulation and area gradation.

In the laser intensity modulation technique, the light intensity of a dot of a laser beam is modulated to express the gradation according to an image data. This technique can have a high resolution and can make the gradation expression smooth. However, as to the high-speed switching performance of laser, the pulse width modulation technique has a problem on the increase in switching speed, while the laser intensity modulation technique is advantageous on this point. Further, the area modulation technique such as a dither method has a bad resolution. Therefore, the laser intensity modulation technique is expected to become one of main digital gradation techniques.

However, the laser intensity modulation technique has following problems: (a) Pitch noises, which is characteristic of the laser exposure, such as the irregularities of the sensitizing of the photoconductor by the charger or of the development are liable to occur in the subscan direction. (b) Noises of image data sent from an image reader are also reproduced faithfully. (c) Because the high gradation can be realized basically, a reproduced image may lack the smoothness as for the impression of a whole image.

The image quality and noises are especially important for the reproduction of a color image because a document often includes a pictorial image.

SUMMARY OF THE INVENTION

An object of the present invention is to provide a digital image forming apparatus which can form an image of high quality with use of the intensity modulation technique.

In a digital image forming apparatus, an electrostatic latent image is formed by the exposure with a beam on a photoconductor in the raster scan according to image data in the electrophotographic process, wherein the intensity of the beam is modulated according to the image data. The exposure is controlled so that the exposure is enabled only for a predetermined light-emitting time in the time needed to scan a predetermined period of consecutive dots in the scan line direction. Thus, the exposure is stopped periodically in the scan line direction. The period of consecutive dots and a time ratio of the light-emitting time to the scan time needed to scan the period may be selected as a combination or independently of each other. The intensity of the beam may be increased as the ratio decreases, so as to compensate the decrease in image density.

An advantage of the present invention is that the pitch noises in the subscan direction can be decreased.

Another advantage of the present invention is that the desired smoothness and the resolution can be selected.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 3a–3e are diagrams of laser drive signals when the duty ratio is 80%;

FIGS. 5a–5e are diagrams of laser drive signals when the duty ratio is 60%;

FIGS. 7a–7e are diagrams of laser drive signals when the duty ratio is 50%;

DETAILED DESCRIPTION OF THE PREFERRED EMBODIMENTS

(a) Structure of Digital Color Copying Machine

Figure 1:
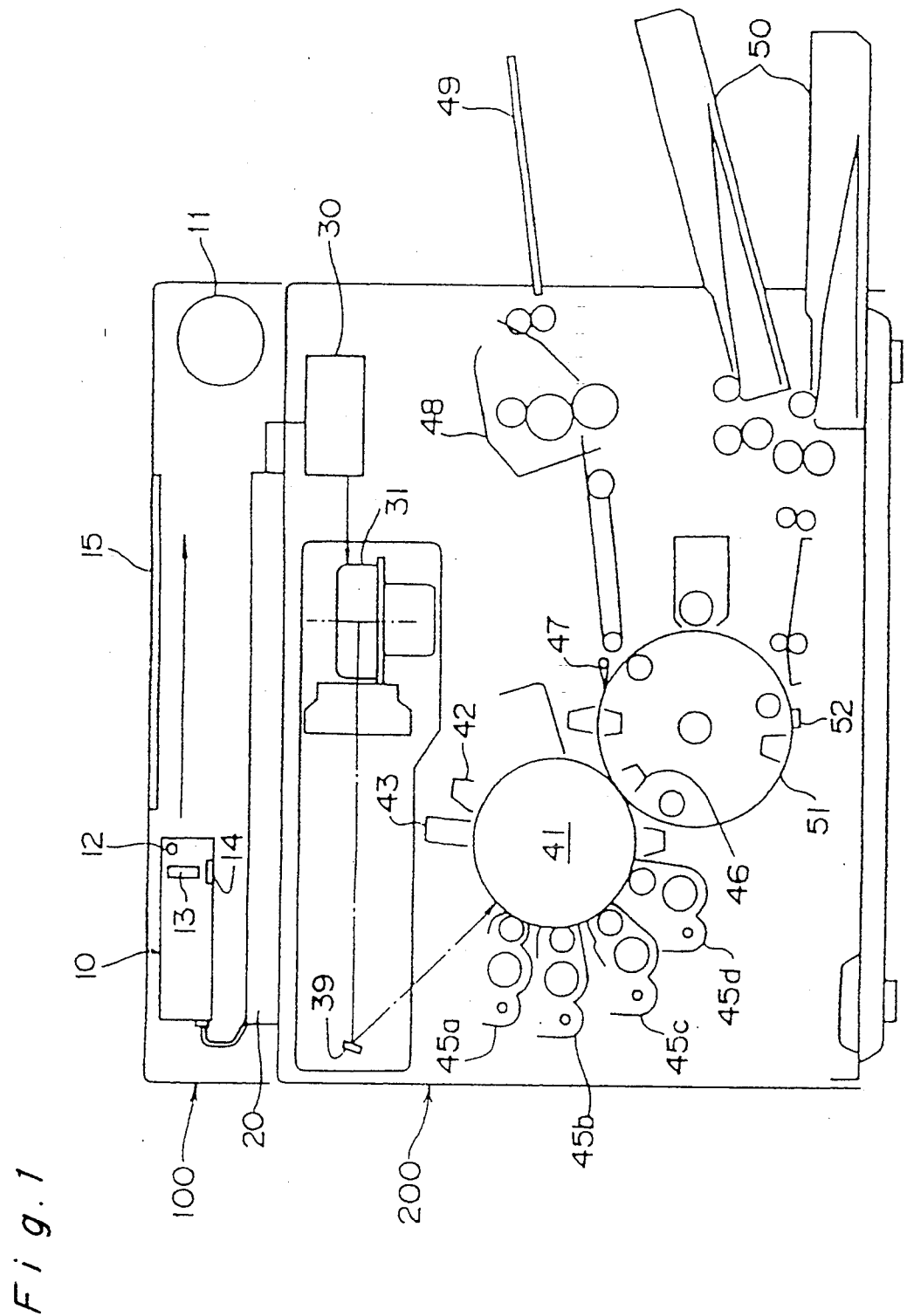
FIG. 1 is a sectional view of a digital copying machine.

Referring now to the drawings, wherein like reference characters designate like or corresponding parts throughout the views, FIG. 1 shows a digital copying machine of an embodiment of the present invention which consists of an image reader section 100 for reading a document image and a copying section 200 for reproducing an image read by the image reader section 100.

The structure of the image reader section 100 is similar to a conventional image reader, wherein a scanner 10 has an exposure lamp 12 for illuminating a document, a rod lens array 13 for collecting the light reflected from the document and a CCD color image sensor 14 of contact type for converting the collected light to an electrical signal. When a document put on a platen 15 is read, the scanner 10 is moved by a motor 11 in the direction designated by an arrow (or in the subscan direction) in order to scan the document while the document is illuminated by the exposure lamp 12. The image sensor 14 converts the optical image of the document to electrical signals. Then, the electrical signals of three colors of red, green and blue detected by the image sensor 14 are converted to 8-bit gradation data of yellow, magenta, cyan and black by a read signal processor 20 to be stored in a buffer (FIFO memory) 30 for synchronization.

In the copy section 200, a print head 31 performs the gradation correction (gamma correction) of the input gradation data in accordance to the gradation characteristic of the photoconductor and converts the corrected digital image data to an analog signal to generate a drive signal for the laser diode 37, which emits a beam according to the drive signal. As will be explained later, the duty ratio of the light-emitting time of the laser diode 37 to the dot period in the main scan direction is selected by a user with keys provided in an operational panel 20.

The laser beam is generated by the print head 31 by modulating the light-emitting intensity in accordance to the gradation data, and it is reflected by a mirror 39 to expose a photoconductor drum 41 which is driven to be rotated.

The intensity of the laser beam is changed according to a mode selected as will be explained later. The photoconductor drum 41 is illuminated by an eraser lamp 42 and sensitized uniformly by a sensitizing charger 43 for each copy before the exposure. When the photoconductor drum in this state is subjected to the exposure with a laser beam for raster scan, an electrostatic latent image of a document is generated on the photoconductor drum 41. One of the development units 45a–45d of yellow, magenta, cyan and black toners is selected to develop the electrostatic latent image. A paper is fed from a cassette 50, and the top of the paper is chucked by a chucking mechanism 52 on a transfer drum 51 in order to prevent the position shift on the overlap of toner images of four colors. The developed toner image is transferred to the paper wound on the transfer drum 51 by a transfer charger 46.

The above-mentioned print process is repeated on the four colors of yellow, magenta, cyan and black, and the scanner repeats the scan motion in synchronization of the movement of the photoconductor drum 41 and the transfer drum 51. Then, the paper is separated from the transfer drum 51 by the operation of a separation claw 47 at an appropriate time, fixed by a fixing unit 48 and discharged outside to a tray 49.

(b) Image Signal Processing

Figure 2:
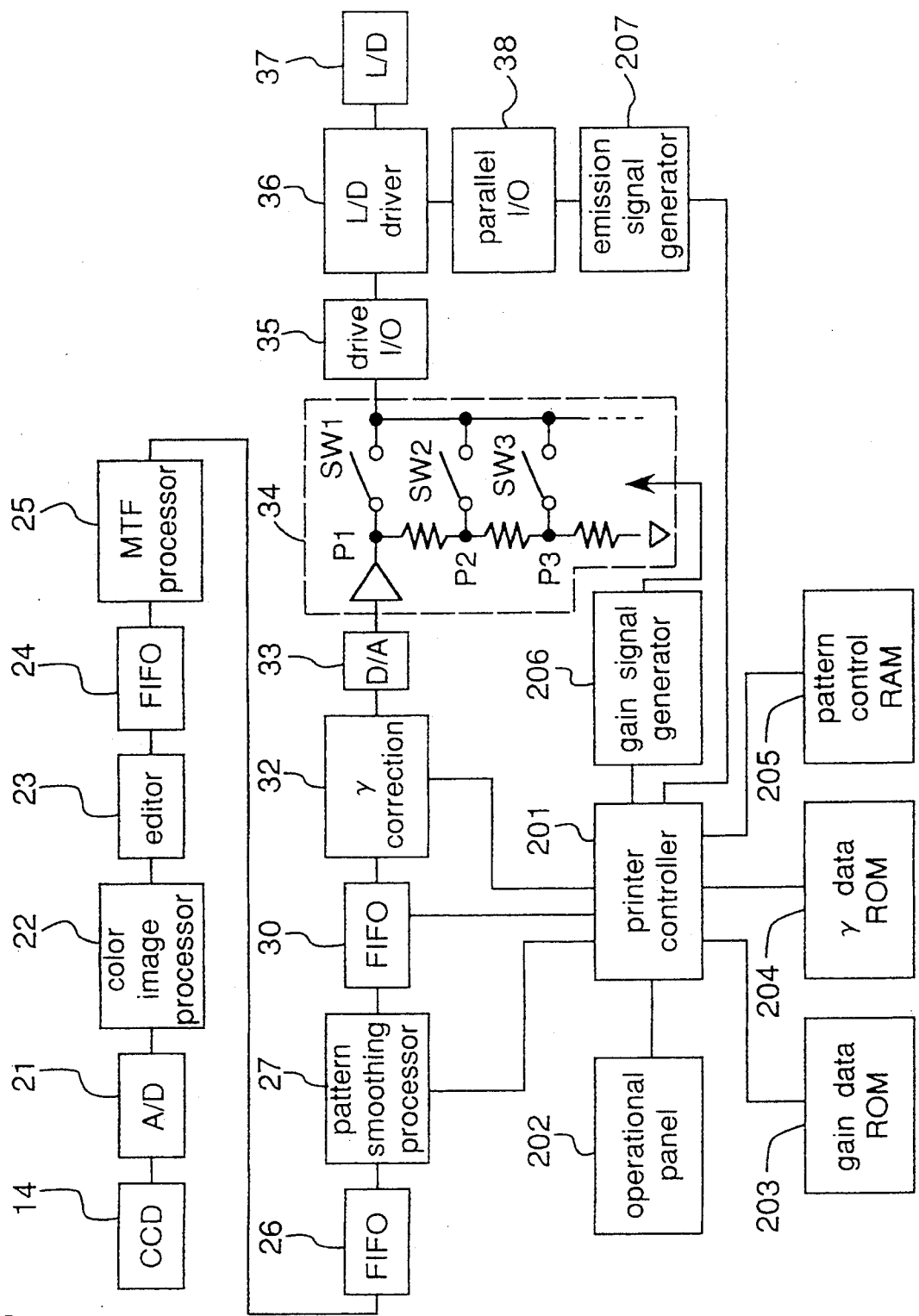
FIG. 2 is a block diagram of image processing systems of an image processor and of a print head.

FIG. 2 is a block diagram on the image signal processing both of the image signal processor 20 and of the print head 31. In the image reader section 100, a document is read with the CCD sensor 14 to be converted to electrical signals. After the electrical signals are converted to multi-level digital values by an A/D converter 21, they are subjected to the shading correction, the masking processing, the density correction and the like in the color image processor 22. Then, the read data are processed for edition in the editor 23 and stored in a first first-in first-out (FIFO) memory 24.

Figure 9:
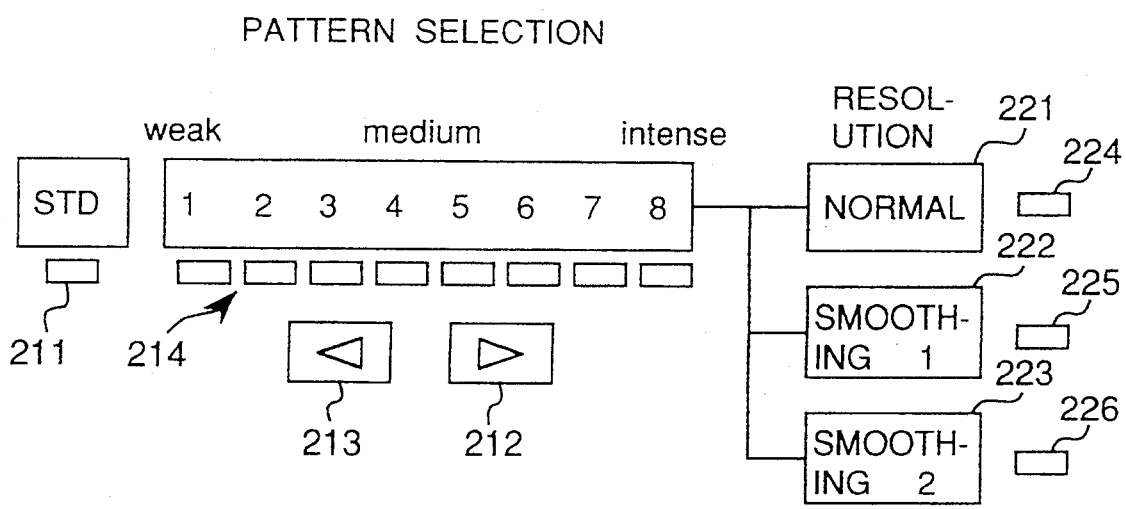
FIG. 9 is a schematic diagram of an example of selection keys provided in the operational panel.

In the printer section 200, an operational panel 202 has keys for selecting a smoothing level (N, X) and the resolution (FIG. 9). The operational panel 202 sends selection signals to a printer controller 201, which stores the received values in a pattern control RAM 205. Then, the laser intensity $P_{max}$, the light-emitting duty ratio and the period of N dots stored in the gain data ROM 203 are selected. Further, the gamma characteristics according to each selected smoothing level are stored in a gamma data ROM 204. The data read from the first FIFO memory 24 is subjected to a known spatial filtering processing such as smoothing and edge emphasis in the modulation transfer function (MTF) processor 25 and stored in a second FIFO memory 26.

The printer controller 201 sends the selection signals to the pattern smoothing processor 27. Further, the printer controller 201 sends the gamma correction data to the gamma correction section 32 by reading the data stored in the gamma data ROM 204 for each setting values (N, X) of smoothing level. Further, the printer controller 201 sends a gain signal for controlling the light-emitting intensity P of the laser diode 34 to a gain signal generator 206 to change the light-emitting intensity, while it also sends a clock change signal for controlling the period and the duty ratio of the emission signals (clocks) to an emission signal generator 207 in order to change the timing of the emission signal in accordance to the selected smoothing level.

Next, the data read from the second FIFO memory 26 are averaged if necessary by the pattern smoothing processor 27 according to a selection signal received from a printer controller 201 on the basis of the data stored in the pattern control RAM 205. That is, when "NORMAL" or "SMOOTHING 1" (refer FIG. 9) is selected for the pattern smoothing processing by the operational panel 202, the data are not processed or sent through without any processing in the pattern smoothing processor 27, while when "SMOOTHING 2" (refer FIG. 9) is selected, the smoothing processing is performed. The processed data are stored in a third FIFO memory 30.

The image density data read from the third FIFO memory 30 are converted by the gamma correction section 32 to a laser exposure level by using the gamma correction data received from the printer controller 201 according to the selected pattern condition stored in the pattern control RAM 205. The data after the gamma correction are converted by a digital-to-analog converter 33 to analog signals, which are amplified by an amplifier 34 at a gain to be sent through a drive I/O circuit 35 to a driver 36 for the laser diode 37. In the amplifier 34, the gain is changed by dividing an input voltage by a switch SW1–SW8 selected by the gain signal generator 206 in accordance to a gain signal received from the printer controller 201. The driver 36 makes the laser diode 37 emit at an intensity in accordance with a voltage received through the drive I/O 35. Therefore, the gain of the amplifier 34 corresponds to the light-emitting intensity P1, P2 or the like.

The printer controller 201 sends a clock change signal to the emission signal generator 207 in accordance with the duty ratio determined according to the selected smoothing level (N, X). The emission signal generator 207 generates emission signals according to clocks which have the duty ratio in correspondence to the clock change signal and sends emission signals through the parallel I/O 38 to the driver 36. The driver 36 generates the driving current only in the light-emitting time or when an emission signal generated according to the smoothing level (N, X) is received. In other words, the duty ratio and the period of laser exposure can be governed by the emission signals (clocks). The laser diode driver 36 generates the driving current according to the image signals received through the drive I/O 35 in order to drive the laser diode 37 only when the emission signals are received.

Thus, the image data sent from the image reader section 100 are exposed onto the photoconductor by modulating the laser intensity and by changing the light-emitting time.

(c) Control of the Smoothness of an Image

In the present embodiment, a user can select a combination of the smoothness for naked eyes and the resolution in order to reproduce a better quality of image. This is advantageous especially for documents including a pictorial image in a full-color copying machine.

The smoothing level is set as both the dot number (period) N in the main scan (horizontal) direction and the duty ratio X. The dot number N denotes the number of consecutive dots in the horizontal direction (or in the scan line direction in the raster scan) and it is a unit for the processing of the control of the smoothness of an image. The duty ratio X denotes a time ratio of a light-emitting time $T_1$ to the whole time $T_2$ needed to scan the consecutive N dots. That is, $X = T_1/T_2$. The above-mentioned emission signals are generated according to the smoothness level by the generator 207, and the light-emission with the laser diode 37 is possible only in the light-emitting time $T_1$. In other words, the laser is not allowed to emit in any time except the light-emitting time.

The amount of toners adhered to a paper becomes large at the center of the dots (formed in the light-emitting time) and small between the series of N dots (in the non-light-emitting time) in correspondence to the duty ratio X smaller than 100%. If the exposure and the development for a line in the horizontal direction are performed continuously in the vertical direction, linear patterns (gaps) are formed. If the duty ratio X is decreased, the gaps become more emphasized to form prominent vertical linear patterns. As mentioned above, pitch noises occur in the subscan or horizontal direction particularly in the laser intensity modulation technique. However, the gaps in the vertical direction make the pitch noises obscure, so that a smooth image can be reproduced on a paper.

A gap can be inserted every N dots in the emission signals. That is, the period of the gaps can be changed according to the dot period N. The period N can be selected by a user. Even if the duty ratio X of the light-emission time is kept the same, when the dot period N is increased, the linear patterns in the vertical direction become prominent further and the smoothness of the image is enhanced. On the contrary, when the period N is decreased, the resolution of the image is improved.

If the light-emitting intensity is kept the same, the amount of adhered toners decreases with decreasing duty ratio X. Therefore, when the duty ratio X is decreased, the light-emitting intensity is increased for compensation of the decrease in duty ratio in order to keep the toner density the same.

Further, the gradation characteristic (gamma characteristic) changes delicately according to the setting values of (N, X). Then, the gradation characteristic is also changed according to the setting of (N, X).

Still further, a smoothing method can also be selected by a user to change the resolution, as will be explained later.

Figure 4A:
FIGS. 4a–4d are diagrams of examples of toner images when the duty ratio is 80%.

FIGS. 3(a), (b), (c) and (d) show the emission signals generated by the emission signal generator 207 when the period N is changed from one to four under the same duty ratio X=80% at a half-tone density. FIG. 3 (b) shows the light-emitting intensity of the laser. The laser intensity is controlled to be higher than that at X=100% displayed as a dashed line according to the duty ratio X. In the smoothness level (N, X), as shown in FIG. 4(a), the toner amount is somewhat larger at the center of a dot, while gaps with a somewhat smaller toner amount are formed between dots. If the same light-emitting signals are supplied continuously in the subscan direction, vertical linear patterns are formed.

Figure 4B:
Figure 4C:
Figure 4D:
Figure 6A:
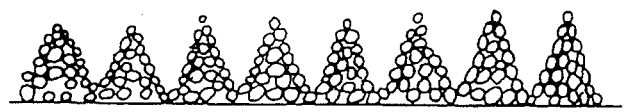
FIGS. 6a–6d are diagrams of examples of a toner images when the duty ratio is 60%.
Figure 6B:
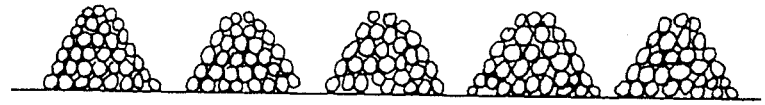
Figure 6C:
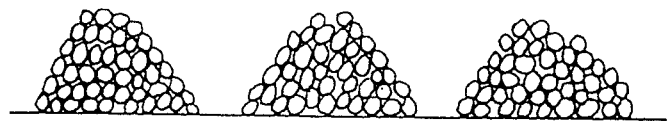
Figure 6D:
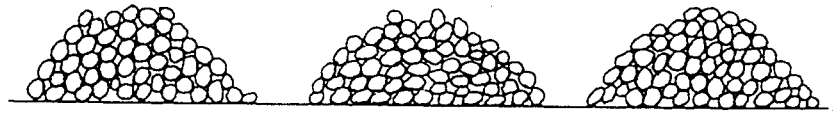
Figure 8A:
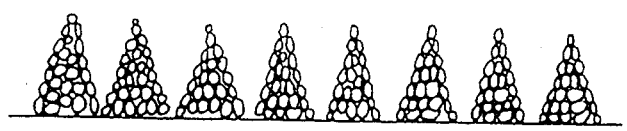
FIGS. 8a–8d are diagrams of examples of toner images when the duty ratio is 50%.
Figure 8B:
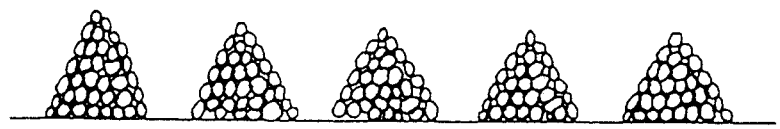
Figure 8C:
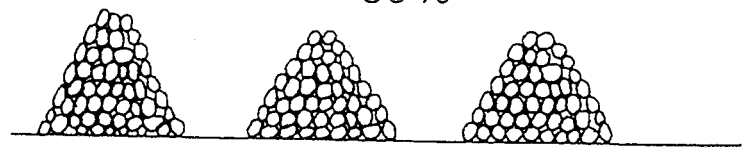
Figure 8D:
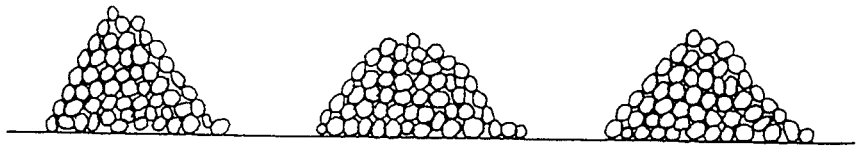

In cases of N=2, 3 and 4, as shown in FIGS. 4(b), (c) and (d), vertical linear patterns are emphasized for naked eyes, and the noises in the subscan direction become less obscure with increasing dot number N. Then, a smooth image quality can be realized as a whole. Even if the S/N ratio of the read image density data is not good, image noises can be made obscure. Pseudo-contour noises in random directions may also be decreased.

Similarly, FIGS. 5(a), (c), (d) and (e) show the situations when the period N is changed from one to four under the same duty ratio X=60% at a half-tone density. FIG. 5(b) shows the light-emitting intensity of laser. The laser intensity is controlled to be still higher than that at X=100% displayed as a dashed line according to the larger duty ratio X. FIGS. 6(a)–(d) show toner images in correspondence to the four cases displayed in FIGS. 5(a), (c), (d) and (e) schematically, respectively. When the period N is kept the same, the gaps becomes more prominent with increasing duty ratio X.

Further, FIGS. 7(a), (c), (d) and (e) show the situations when the period N is changed from one to four under the same duty ratio X=50% at a half-tone density. FIG. 7(b) shows the light-emitting intensity of laser, respectively. The laser intensity is controlled to be still higher than that at X=100% displayed as a dashed line according to the larger duty ratio X. FIGS. 8(a)–(d) show toner images in correspondence to the four cases displayed in FIGS. 7(a), (c), (d) and (e) schematically, respectively. When the period N is kept the same, the gaps becomes more prominent with increasing duty ratio X.

In the standard condition (STD), the gradation is expressed at the one-dot period (N=1) by modulating the beam intensity at 256 steps against the 100% light-emission period (X=100%).

In the present embodiment, the N-dot period can be selected at four steps of one to four and the duty ratio (X) of light emission period can be selected at three steps of 100, 80 and 60%.

For the convenience of a user on the selection of the pattern condition, a user can select one of a plurality of combinations of (N, X) which are arranged in the order of smoothness successively. The pattern conditions are shown in Table 1. Thus, a user can select desired smoothness and resolution easily among nine patterns including the standard condition (STD).

TABLE 1

| pattern smoothness code | Pattern conditions | | α | P |
| --- | --- | --- | --- | --- |
| | dot period (N) | duty ratio (X) (%) | | |
| 0(STD) | 1 | 100 | 1.000 | $P_o$ |
| 1 | 1 | 80 | 0.900 | $1.125\ P_o$ |
| 2 | 1 | 60 | 0.900 | $1.50\ P_o$ |
| 3 | 2 | 80 | 0.933 | $1.17\ P_o$ |
| 4 | 2 | 60 | 0.933 | $1.56\ P_o$ |
| 5 | 3 | 80 | 0.967 | $1.21\ P_o$ |
| 6 | 3 | 60 | 0.967 | $1.61\ P_o$ |
| 7 | 4 | 80 | 1.000 | $1.25\ P_o$ |
| 8 | 4 | 60 | 1.000 | $1.67\ P_o$ |

The laser light-emitting intensity P set according to the following relation:

$$P = (P_o/X) \times 100 \times \alpha, \qquad (\alpha \leq 1)$$

wherein $P_o$ is the light emitting intensity in the standard condition (STD), and α is determined so that gaps can be produced appropriately. When the period N is small, if the light intensity becomes too large, the gaps cannot be produced well and vertical linear patterns cannot be formed well. Then, α is set to be small. On the other hand, α is increased to one with increasing N. An upper limit of the increase of P may be provided.

FIG. 9 shows an example of selection keys provided in the operational panel 202. In the initial setting such as when the power is turned on, the standard condition (STD) of (N, X)=(1, 100) is selected, and the LED display 211 below the STD mark is turned on. A user can select the smoothing conditions at eight steps by pressing an increase key 212 or a decrease key 213, and one of LED displays 214 in correspondence to the selected step is turned on. The eight LEDs included in the LED display 214 corresponds to a pattern smoothness code (PSC) from one to eight, respectively, and the code corresponds to the pattern condition shown in Table 1. In Table 1, the standard condition (STD) corresponds to zero of the pattern smoothness code. When the pattern smoothness code increases from one to eight, the dot period N and the duty ratio X are changed, and the smoothness of image increases and pitch noises decrease.

Further, the resolution can be selected with keys 221, 222 and 223 for normal processing (without smoothing processing), for smoothing 1 processing (average processing) and for smoothing 2 processing (anamorphic processing), respectively, and an LED display 224,225 or 226 in correspondence to the selected key is turned on. This is explained in detail in the section (d). In the initial state, the normal processing is set, and no smoothing processing is performed.

Figure 10:
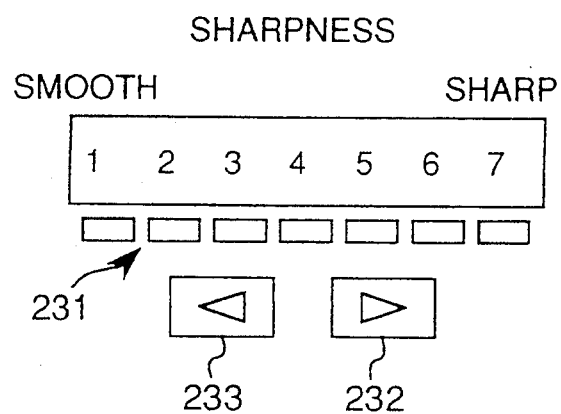
FIG. 10 is a schematic diagram of another example of selection keys provided in the operational panel.

In a modified example shown in FIG. 10, an increase key 232 and a decrease key 233 are provided for sharpness selection instead of the keys 221–223 for resolution displayed in FIG. 9. The sharpness can be set at seven steps between the smoothness and sharpness. A user can select one of seven steps of the sharpness by pressing the increase key 232 or the decrease key 233, and one of LED displays 231 in correspondence to the selected sharpness is turned on. According to the selected sharpness, the degree of the smoothing or the edge emphasis in the modulation transfer function (MTF) processor 25 is controlled. When the sharpness is set as four, no smoothing and edge emphasis are performed. When the sharpness is set between one to three, a known smoothing processing is performed with use of a spacial filter, and when the sharpness is one, a smoothing filter of the largest smoothing effect is used. On the other hand, when the sharpness is set between five to seven, a known edge emphasis processing is performed with use of a Laplacian filter, and when the sharpness is seven, a smoothing filter of the largest edge emphasis effect is used. The image processing according to the selection keys 232 and 233 changes the MTF characteristics of the image itself. That is, it is different essentially from the smoothing of an image by selecting the dot period N and the duty ratio X. At the same time as the edge emphases with the filtering processing in the MTF processor 25, noises can be decreased by increasing the pattern smoothness code, without smoothing an image.

(d) Smoothing of the Image Data

As explained above, the smoothness can be changed by selecting the pattern according to the pattern condition (N, X). Further, in a digital copying machine, the image quality can be controlled by the pattern smoothing processor 27 according to the selection of the pattern smoothing processing of image data. In the present embodiment, vertical linear patterns are formed at the N-dot period in the main scan direction. Therefore, the resolution and the smoothness of a reproduced image may be different whether the image data of N dots are averaged or not. In the present embodiment, the smoothing is performed basically only by using the pattern control without the smoothing processing of image data. However, the averaging processing of image data explained later may produce a more smooth image by using the averaging processing in the pattern smoothing processor 27.

Figure 11A:
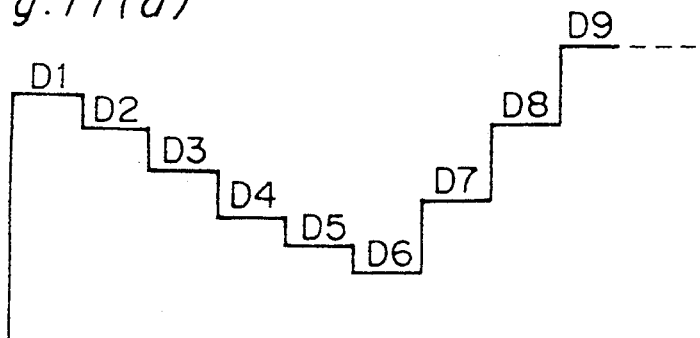
FIGS. 11a–11d are diagrams for explaining the processing according to the resolution.
Figure 11B:
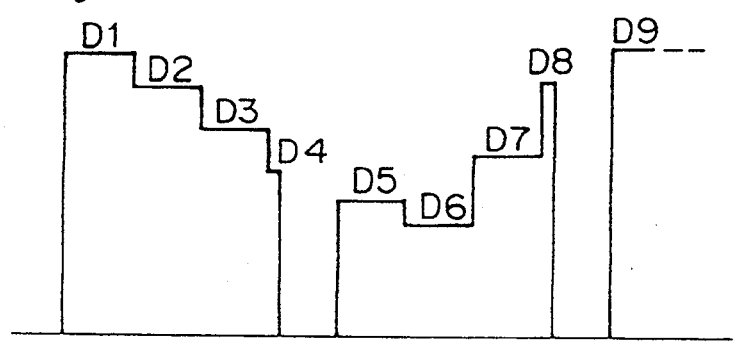
Figure 11C:
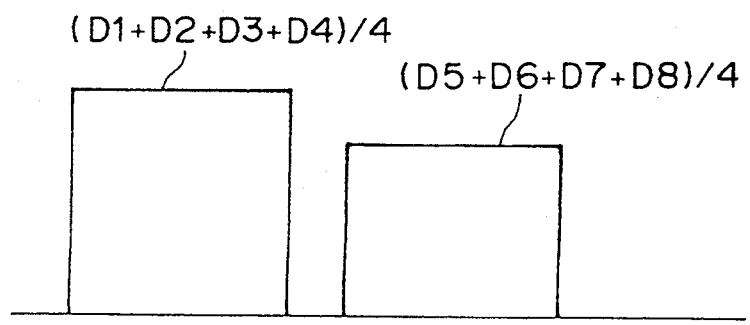
Figure 11D:
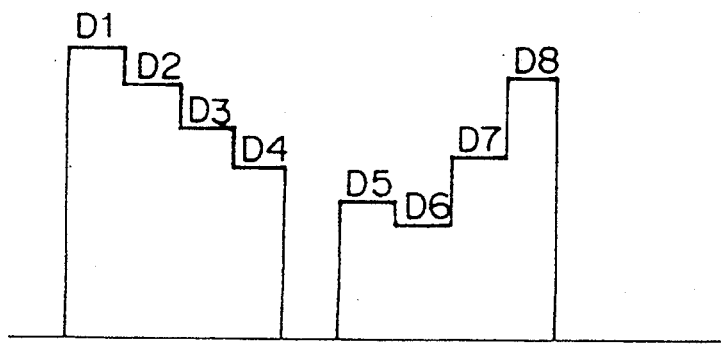

FIGS. 11(b)–(d) show examples of N=4 and X=80%. FIG. 11(b) displays the laser exposure level and the pulse when the image data $D_1, D_2, D_3, \ldots$ in the scan line direction shown in FIG. 11(a) are not subjected to the smoothing processing (or when "NORMAL" is selected with the key 221 in the operational panel shown in FIG. 9). The light-emitting signals are generated in the conditions that the dot period N is four and the duty ratio X is 80%. Then, if the basic time duration of one dot is denoted as T, the light-emitting signal is generated for a light-emitting time of 3.2 T and not in the remaining time of 0.8 T. In a four-dot period, the image data $D_1, D_2$ and $D_3$ as such are sent, while the image data $D_4$ of the fourth dot is sent as a pulse only of 0.2 T duration. In this case, the data are not averaged, so that the shape of an image is maintained.

FIG. 11(c) displays the laser exposure level and the pulse when the image data are subjected to the smoothing processing (or when "SMOOTHING 1" is selected with the key 222 in the operational panel shown in FIG. 9). In a four-dot period, an average of the image data in the period is sent as the laser exposure level. For example, for the first four dots, an average $(D_1 + D_2 + D_3 + D_4)/4$ is calculated and the average value is sent for $4 \times 0.8 = 3.2$ T duration. Thus, a more smooth image can be obtained, while the resolution is decreased eventually. On the contrary, in the method of FIG. 11(b), the resolution does not decrease so largely because the image of 3.2 T duration can be reproduced faithfully to the read image data of FIG. 11(a). Further, the method of FIG. 11(c) is advantageous in that the average image density can be maintained better.

Further, when the "SMOOTHING 2" is selected with the key 223 in the operational panel shown in FIG.

9, the duration of each dot is shortened than T according to the duty ratio X by controlling by the printer controller 201 the timing of reading image data from the FIFO memory 30 to send them to the digital-to-analog converter, while the value for each dot is not changed. That is, the data of each dot is sent in the short duration in correspondence to the duty ratio of 80%. For example, the image data $D_1$, $D_2$, $D_3$ and $D_4$ are output in the duration of 0.8 T and not in the following 0.2 T. This method is superior in a point that the average density can be maintained well and the resolution is better than the method of FIG. 11(c). However, because the image is contracted periodically in this method, the method of FIG. 11(c) is better on the continuity of image.

As explained above, the methods of FIGS. 11(b)-(d) have characteristics different from each other. A user can select an appropriate pattern smoothing method according to the character of image or the taste of the user.

(e) Flow of Image Pattern Control

Figure 12:
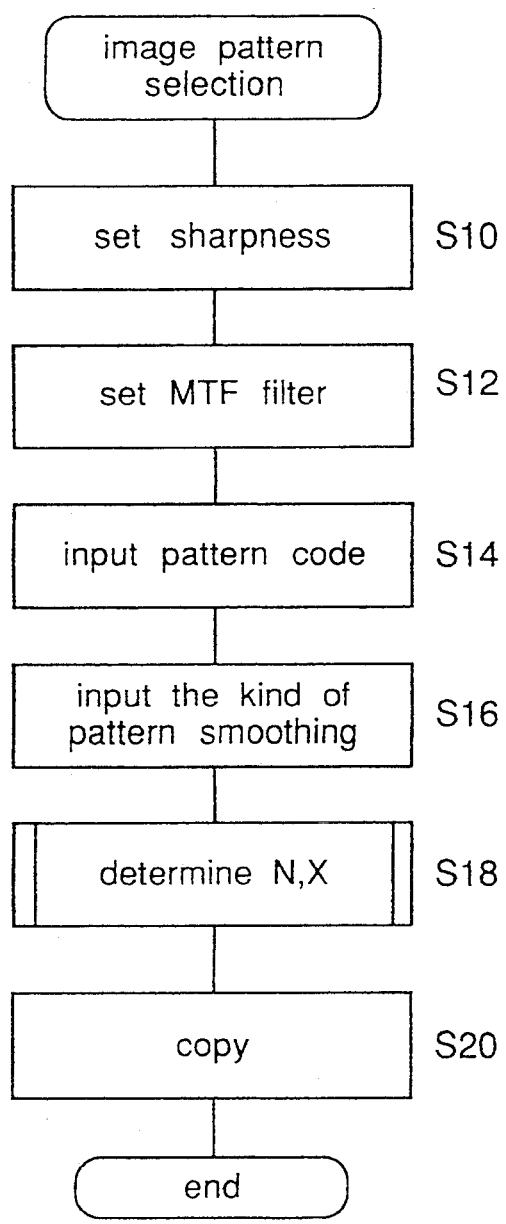
FIG. 12 is a flowchart of image pattern selection.

FIG. 12 shows a flow of image pattern selection of the CPU in the printer controller 201. First, the spacial filter to be used in the modulation transfer function processor 25 is selected (step S12). Next, the pattern smoothness code (1–8) is selected with the keys 212 and 213 (step S14), and the kind of pattern smoothing processing (NORMAL, SMOOTHING 1, SMOOTHING 2) is selected with the keys 221, 222 and 223 (step S16). The N, X and the smoothing conditions are determined according to the settings, and stored in the pattern control RAM 205 (step S18, refer FIG. 13). Then, a copy routine is performed for copy operation (step S20) wherein the gain and the clock in accordance to the N and X stored in the gain data ROM 203 are set in the laser diode driver 33; the gradationl characteristic in accordance to the N and X is set in the gamma correction section 32 from the gamma data ROM 204; and the smoothing processing in accordance to the kind of the smoothing pattern processing is set in the pattern smoothing processor 27. In the cases of "NORMAL" and "SMOOTHING 2" (refer FIG. 9), the data processing is not performed, while in the case of "SMOOTHING 1", the above-mentioned averaging is performed.

Figure 13:
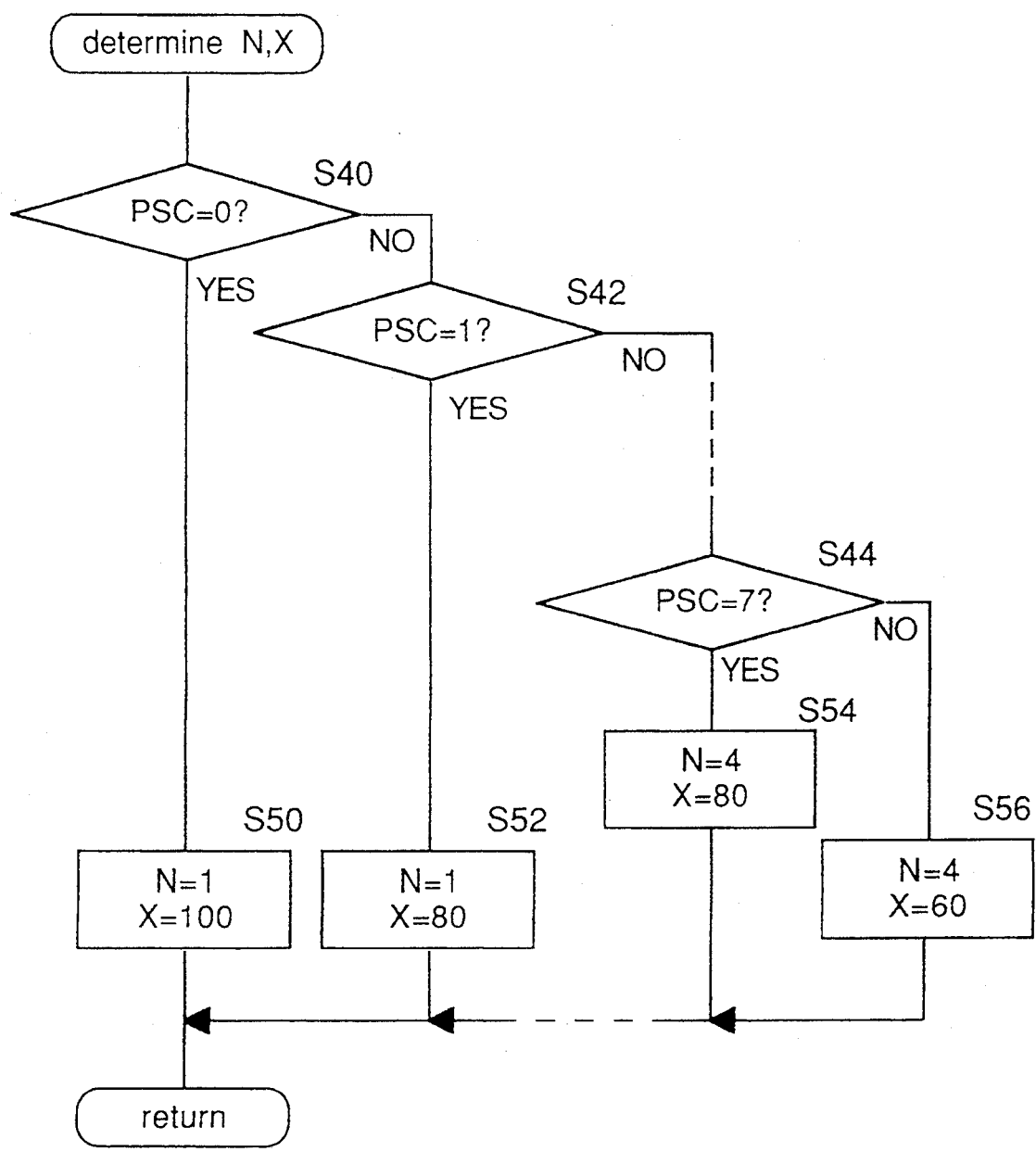
FIG. 13 is a flowchart of the determination of N, X and the smoothing condition.

FIG. 13 shows a flow of the determination of N, X and smoothing condition (FIG. 12 step S18) in detail. In this flow, the pattern smoothness code is decided to be one among one to eight (steps S40, S42, S44 and the like) and the N and X are determined according to the pattern smoothness code (steps S50, S52, S54 and the like). Then, the determined values are stored in the pattern control RAM 205.

(f) Modified Examples

Figure 14:
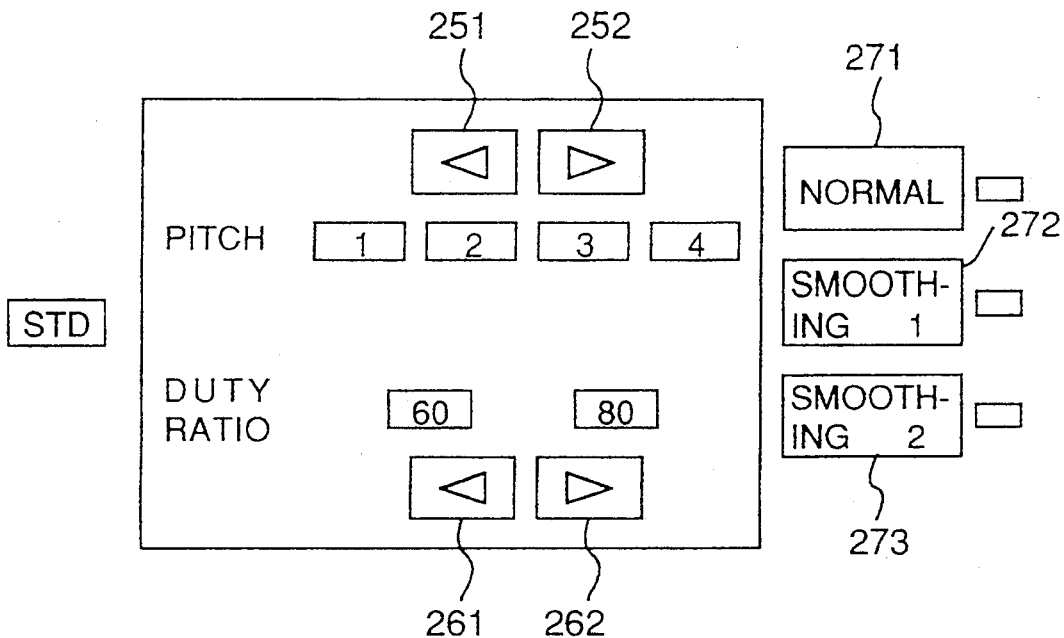
FIG. 14 is a diagram of a modified example of selection keys.

The pattern smoothing can be set for each pattern condition N, X, as shown in FIG. 14. That is, the dot period N is set at four steps with pitch selection keys 251 and 252, while the duty ratio X can be set at two steps of 60% and 80% with duty ratio selection keys 261 and 262. Further, similarly to FIG. 9, the standard setting (STD) can be selected. As to the pattern smoothing processing, one of the three kinds of "NORMAL", "SMOOTHING 1" and "SMOOTHING 2" can be set with the keys 271, 272 and 273. In this modified embodiment, the N and X can be set independently and eight types of image can be obtained. Further, by changing the kind of pattern smoothing processing, an image of twenty four ways can be realized.

Figure 15:
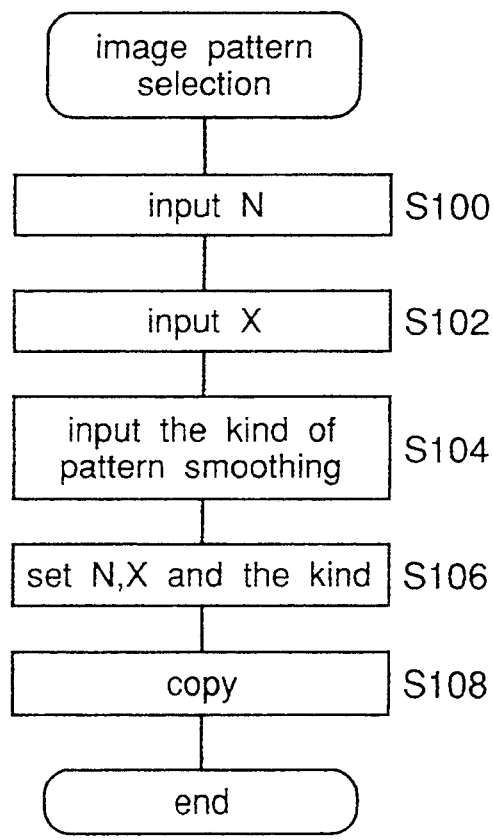
FIG. 15 is a flowchart of a modified example of image pattern selection.

FIG. 15 shows a flow of the image pattern selection processing. That is, the dot period N, the duty ratio X and the kind of the smoothing processing (resolution) are selected successively (steps S100, S102 and S104). Then, the N, X and the kind of the smoothing processing are set in correspondence to the selected values (step S106). Next, a copy operation is performed (step S108), and the flow returns to the main flow.

In the above-mentioned examples, the N and X are set at prescribed values such as 3 and 80%. However, the other values may be adopted for the setting. Further, a modified example can also be constructed wherein arbitrary values of N and X can be selected.

In the above-mentioned examples, the laser diode driver 36 drives the laser diode 37 only when the emission signals generated according to the smoothness level are received from the emission signal generator 207. However, instead of generating the emission signals by using the emission signal generator 207, the image data themselves may be processed by the printer controller 201 to replace the data with "0" for dots which are not included in the light-emitting time. This data processing may be performed for example in the pattern smoothing processor 27 when the data after the smoothing processing is sent to the third FIFO memory 30. In this case, the duty ratio is determined as ratio of a number of the consecutive dots included in the light-emitting time to a number of the dots included in the whole period.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A digital image forming apparatus comprising:
   a photoconductor;
   an exposure means for exposing a surface of said photoconductor with a beam in raster scan so as to form an electrostatic latent image thereon;
   an exposure control means for controlling an intensity of the beam of said exposure means according to image density data designating a density of respective picture dots of an image to be formed;
   a setting means for setting a number of dots of image data; and
   a light-emission control means for inhibiting said exposure means to expose said photoconductor every predetermined period corresponding to a period for exposing said set number of dots of image data so that an interval is formed between light-emitting periods.

2. A digital image forming apparatus according to claim 1, further comprising:
   a ratio changing means for changing a ratio of the light-emitting period against the interval.

3. A digital image forming apparatus according to claim 2, wherein said ratio changing means increases the intensity of the beam as the ratio decreases.

4. A digital image forming apparatus according to claim 2, further comprising:
   a memory for storing a plurality of combinations of the number of the dots and the ratio; and a selecting means for selecting one of the combinations stored in the memory.

5. A digital image forming apparatus according to claim 4, further comprising:
   a second memory for storing a plurality of image density correction data; and
   a means for setting one of the image density correction data according to the selected combination.

6. A digital image forming apparatus according to claim 1, wherein said exposure control means includes an averaging means for averaging the image density data of said set numbers of dots before they are exposed.

7. A digital image forming apparatus comprising:
   a photoconductor;
   an exposure means for exposing a surface of said photoconductor with a beam in raster scan so as to form an electrostatic latent image thereon;
   an exposure control means for controlling an intensity of the beam of said exposure means according to image density data designating a density of respective picture dots of an image to be formed;
   a setting means for setting a number of dots of image data; and
   a light-emission control means for inhibiting said exposure means to expose said photoconductor for a predetermined time period every time said set number of dots of image data is exposed so that an interval is formed between light-emitting periods.

8. A digital image forming apparatus according to claim 7, further comprising:
   a ratio changing means for changing a ratio of the light-emitting period against the interval.

9. A digital image forming apparatus according to claim 8, wherein said ratio changing means increases the intensity of the beam as the ratio decreases.

10. A digital image forming apparatus according to claim 7 further comprising:
    a memory for storing a plurality of image density correction data; and
    a means for setting one of the image density correction data according to the set number of dots.

11. A digital image forming apparatus comprising:
    a photoconductor;
    an exposure means for exposing a surface of said photoconductor with a beam in raster scan so as to form an electrostatic latent image thereon;
    an exposure control means for controlling said exposure means according to image data designating a density of respective picture dots of an image to be formed;
    a light-emission control means for controlling said exposure means so than an interval can be formed between light-emitting periods;
    a selecting means for selecting a number of dots of image data; and
    a changing means for changing a duration of the light-emitting periods according to the selected number of dots of image data.

12. A digital image forming apparatus according to claim 11, further comprising a ratio changing means for changing a ratio of the light-emitting period against the interval.

13. A digital image forming apparatus according to claim 11, wherein said light-emission control means varies the intensity of the light beam in correspondence with the duration of the light-emitting periods.

14. A digital image forming apparatus according to claim 11, further comprising:
    a memory for storing a plurality of image density correction data; and
    a selecting means for selecting one of the plurality of image density correction data in correspondence with the duration of the light-emitting periods.

15. A digital image forming apparatus comprising:
    a photoconductor;
    an exposure means for exposing a surface of said photoconductor with a beam in raster scan so as to form an electrostatic latent image thereon;
    an exposure control means for controlling an intensity of the beam of said exposure means according to image density data designating a density of respective picture dots of an image to be formed;
    scanning period setting means for selectively setting a duration of a scanning period in the raster scan;
    light-emitting period setting means for selectively setting a duration of a light-emitting period during which said exposure means exposes said photoconductor with said beam, the set duration of said light-emitting period comprising a selected portion of the set duration of said scanning period; and
    a light-emission control means for controlling said exposure means to expose said photoconductor with said beam for the set duration of every light-emitting period of every set scanning period of said raster scan so that a desired interval is formed between said light-emitting periods.

16. A digital image forming apparatus according to claim 15 wherein the set duration of a scanning period corresponds to a selected number of said dots, and wherein the set duration of said light-emitting period corresponds to a selected portion of said selected number of dots.

17. A digital image forming apparatus according to claim 15, further comprising:
    a ratio changing means for changing a ratio of the light-emitting period against the interval.

18. A digital image forming apparatus according to claim 17, wherein said ratio changing means increases the intensity of the beam as the ratio decreases.

* * * * *